United States Patent [19]

Musilli Thomas G.

[11] 4,197,134

[45] Apr. 8, 1980

[54] COATING COMPOSITION AND METHOD OF MAKING SAME

[75] Inventor: Musilli Thomas G., Akron, N.Y.

[73] Assignee: Battenfeld Grease & Oil Corp. of New York, North Tonawanda, N.Y.

[21] Appl. No.: 3,233

[22] Filed: Jan. 15, 1979

[51] Int. Cl.$^2$ .................. C09D 3/02; C09D 5/08; C08L 95/00
[52] U.S. Cl. .................. 106/14.11; 106/14.34; 106/160; 106/284
[58] Field of Search ............ 106/14.11, 14.34, 281 R, 106/284, 160; 428/468

[56] References Cited

U.S. PATENT DOCUMENTS

| | | | |
|---|---|---|---|
| 1,115,988 | 11/1914 | Thoma | 106/160 |
| 2,115,425 | 4/1938 | McGrew | 106/14.34 |
| 2,808,398 | 10/1957 | Forward | 106/155 |
| 2,923,643 | 2/1960 | Rodwell | 106/14.34 |

*Primary Examiner*—Theodore Morris
*Attorney, Agent, or Firm*—Sommer & Sommer

[57] ABSTRACT

A sprayable undercoating composition comprising a homogenous mixture of leather dust, water, neutralizer for the acidity of the leather dust, clay-based gellant, polar dispersant, organic rust inhibitor, and solubilized asphalt containing volatile solvent.

4 Claims, No Drawings

COATING COMPOSITION AND METHOD OF MAKING SAME

This invention relates to a coating composition and method of making the same, and more particularly to such a coating composition, commonly known as "undercoating," suitable for spray application to the metal surfaces of vehicular underbodies for protection against corrosion.

An undercoating composition desirably should have the properties and characteristics of being capable of being applied by a conventional spray gun onto the metal surfaces so as to adhere firmly thereto without running or dripping, to readily harden in place to provide a protective coat which is waterproof, long lasting, and resistant against abrasion caused by impingement of stones and dirt particles and water containing acid and basic salts.

An asphaltic compound containing asbestos fibers for use as an undercoating composition is heretofore known and is representatively disclosed in U.S. Pat. No. 3,582,367. While such a compound is safe to use, its manufacture exposes the persons handling the asbestos to a health hazard inasmuch as such persons can collect asbestos dust in their lungs to cause serious pulmonary disease or disorder.

Accordingly, the primary object of the present invention is to provide a suitable undercoating composition which does not contain asbestos fiber and therefore eliminates the health hazard to persons manufacturing the composition.

Another object is to provide such an improved composition which possesses all the desirable attributes of the aforementioned previous asbestos-containing asphaltic compound but without the objectionable asbestos fibers being present.

A further object is to provide such an improved composition which, besides being sprayable, adherent to metal undersurfaces without running, dripping or stringing, waterproof, protective, sound-deadening, durable and abrasion resistant, is composed of relatively inexpensive ingredients, is easy and economical to manufacture, under health-hazard-free and ambient temperature conditions, and following manufacture is capable of standing in sealed containers over long periods of time without settling, separation of stratification of its ingredients but maintains its ready-to-use homogeneity when the container is opened after a long shelf-life.

These and other advantages of the improved composition and its method of manufacture, to be described later herein for preferred embodiments, are achieved by providing a homogenous mixture containing essentially of the following generically designated ingredients in the proportions stated as either percentages or parts by weight:

(1) from 1 to 10% of animal-derived leather dust;
(2) from 0.1 to 1% of water;
(3) neutralizer in sufficient amount to adjust the acidity of the leather dust to about pH9-11 and, preferably, to add a filler to increase abrasion resistance;
(4) from 1 to 10% of clay-based gellant;
(5) from 0.1 to 1% of polar dispersant;
(6) from 0.1 to 5% of organic rust inhibitor; and
(7) the balance to make up 100% of solubilized asphalt containing volatile solvent.

It has been discovered after the testing of many non-mineral type fibrous materials, including cellulosic materials such as ground wood and their flours, ground nut shells and their flours, ground corn stalks and husks and their flours, and ground cotton fibers, all of which were rejected because of their heavy bleed tendency, before their abrasion resistance was even tested, that leather dust in the presence of certain other materials provides an excellent undercoating composition possessing all the desirable attributes and which can be manufactured without being hazardous to the persons handling the leather dust during formulation of the composition.

The leather dust utilized is a waste product and comprises fine leather particles, principally fibrous in physical form, obtained from abrading leather during the manufacture of shoes and the buffing or scraping of leather during its processing or the manufacture of leather articles. Leather scrap in the form of cuttings or chunks can be deliberately abraded to break down the pieces into dust for use in the improved undercoating composition, but this is not as economical since the additional processing increases costs. The preferred leather dust is commercially available and is relatively inexpensive since it is a waste product. The leather dust may be derived from any tanned or cured animal hide or skin. Since the hides of beef cattle are tanned or cured to provide leather from which most soles, boots and shoes are made, this will be the most common type of leather encountered. For use in the practice of the present invention, the fine leather dust should preferably pass through a 100 mesh screen.

Upon information and belief, leather dust never heretofore has been used as an ingredient for an undercoating composition. In fact, investigation has revealed no commercial use directly, as an ingredient in any manufactured product, of leather dust created as the result of abrading or buffing leather during the processing of leather or the manufacture of leather articles such as soles, boots, and shoes. What investigation has shown, on the other hand, is that leather scraps in the form of small pieces or chunks of leather, such as left over leather cuttings from the manufacture of soles, boots and shoes, are utilized commercially as a starting material to be first processed and then combined with other materials.

Thus, U.S. Pat. No. 2,649,911 discloses scrap sole leather and waste leather being first shredded to form hair-like particles having a length of from one-quarter inch to three-quarter inch, air blown to remove leather dust, and these hair-like leather shreds are then mixed with a resinous adhesive and pressure molded into a block utilized as a support for sheet material, like leather when being cut.

As another example, U.S. Pat. No. 2,808,398 discloses a process of preparing a so-called leather dust or flour from cured or tanned leather, including scrap leather, left-overs or waste from hide, boots, shoes, etc., which when processed and comminuted into a particle size of from 1/32 to ⅜ of an inch may be dusted onto a surface to which a liquid bonding agent has been applied, or be premixed with a glue and then sprayed onto a surface, to provide a coating which simulates an integral finished leather surface of the unitary hide or skin type.

The leather dust and solubilized asphalt are usually the principal ingredients, by weight, present in the improved undercoating composition of the present invention. While leather dust absorbs solubilized or cutback asphalt, it tends to agglomerate, even though mixed therewith in conventional mills or grinding machines. This renders it unsuitable for being sprayed by conventional spray gun apparatus. It has been discovered that if the composition, as the last step in its formulation, is passed through a homogenizer operated with at least a pressure of 250 pounds per square inch, a smooth sprayable composition results.

A composition containing less than about 3% leather dust has a lowered resistance to abrasion. Much over 5-6% of leather dust tends to thicken the composition and to impair its sprayability.

It has also been discovered that a fully statisfactory composition is not produced unless the normally acid condition of the leather dust ingredient, probably resulting from the tanning or curing processing, it first neutralized, and made to simulate the pH of the conventional asbestos composition. Most conventional undercoating compositions contain something on the order of 10% asbestos, by weight. Inasmuch as these conventional compositions are non-aqueous solutions, one cannot readily determine the pH of the composition. However, it has been found that if about 10% of asbestos is mixed with a complementary amount (i.e., about 90%) of distilled water, the ph of the water will be increased to about pH 9.3. On the other hand, if the contemplated quantity of leather dust (i.e., about 3.5%) is similarly mixed with a complementary amount of distilled water (i.e., 96.5%), the water will become acidic, having a pH of about 4. At the present time, it is felt that an alkaline solution (i.e. pH of from 9-11), such as experienced with asbestos, will provide a more satisfactory bond with the metal parts, than if the solution were acidic, as resulted from placing leather dust in water.

The improved composition, according to the present invention, seeks to simulate the favorable bonding heretofore achieved with asbestos compositions. To this end, the acidity of the mixture formed by adding about 3.5% of leather dust with water, is made alkaline by adding line (calcium hydroxide) in sufficient amount (about 10%) to raise the pH to the range of from 9 to 11, and preferably to about 9.3, as had been experienced with the asbestos-water mixture. Hence, a mixture of about 3.5% of leather dust and about 10% lime, with about 86.5% of distilled water, will have a pH of about 9.3, thus simulating the asbestos-water mixture. However, since the improved composition is non-aqueous, it is surmised that if the composition contains about 3.5% of leather dust, the composition should also contain about 10% of lime. Lime has two contributing functional advantages: first, it neutralizes the pH of the leather dust and, in sufficient quantity, raises the pH to simulate the asbestos-water mixture; and, secondly, it adds bulk (i.e., insolubles) to the composition. While lime is preferred because of its low cost, any suitable mineral acid neutralizer can be used. To provide like advantages, equivalent compounds, such as other alkaline earth minerals, should, preferably, not be soluble in oil.

The clay-based gellant is desired to absorb solubilized or cutback asphalt and in this functional respect acts like the leather dust, but unlike it, does not impart abrasive resistance or texture to the composition. Such a gellant tends to prevent bleeding of the asphalt from the leather fibers.

Chemical reaction between highly refined clay minerals of the montmorillonite group and selected organic bases produces a family of organophilic clays which are able to gel organic liquids. The clay gellants in powdered form are composed of aggregated platelets with the particles closely stacked together. The ultimate particle size of the reacted clays has a length within the 0.5 to 1.0 micron range and a thickness within the 0.002 to 0.004 micron range.

Gelation of a gellant and oil mixture occurs when the organo-clay particles are properly dispersed. This is accomplished by a small amount of polar dispersant. The mechanics of gelation require that these clay particles be dispersed to their ultimate particle size and evenly distributed throughout the oil. Gel strength is provided by the enormous total surface of a small amount of dispersed clay and by the electrical and cohesive forces between the clay particles.

In the practice of the present invention, it is preferred to employ a fine powdered gellant composed of a mixture of dimethyldioctadecyl ammonium bentonite and dimethylbenzyloctadecyl ammonium bentonite. However, either such ammonium bentonite alone is satisfactory, as is also dimethyldioctadecyl ammonium hectorite or dimethylbenzloctadecyl ammonium hectorite. Such organophilic clay containing a mixture of dimethyldioctadecyl and dimethylbenzloctadecyl ammonium bentonite, is available as "Baragel" from the Baroid Division of NL Industries, Houston, Tex.

Alluding again to the polar dispersant as an additive to the organophilic clay, it is preferred to use propylene carbonate because a high flash-point composition is desired, although a solvent such as acetone or methyl alcohol can be used instead if the flash-point aspect is not considered influential.

Propylene carbonate, or 4-methyldioxolone-2, is an odorless, colorless, stable, non-hygroscopic, non-corrosive, mobile liquid having a low freezing point of −49.2° C., a high boiling point of 241.7° C., and a flash point (TOC) of 270° F. Propylene carbonate is available from Jefferson Chemical Company, Inc., Houston, Tex.

The polar dispersant acts like a swelling agent for the organophilic clay and its presence in the improved undercoating composition is desired to increase the amount of solubilized or cutback asphalt that such claybased gellant can absorb, and also to prevent asphalt from bleeding from the leather dust.

The organic rust inhibitor is oil-soluble and is present in the improved undercoating composition to repress the development or growth of rust on the ferric metal surfaces coated with this composition.

Petroleum sulfonates and fatty acids are good examples of organic rust inhibitors for use in the improved undercoating composition. Natural petroleum sulfonates are sulfonic acid derivatives of petroleum fractions. Sulfonation of alkylated benzenes or naphthalenes produce synthetics quite similar to their natural models.

The organic rust inhibitor for use in the improved undercoating composition is selected basically on cost. It is preferred to employ a tallow fatty acid, such as that available from The Procter & Gamble Company as "T-22" tallow fatty acid.

The asphalt is the principal ingredient in the improved undercoating composition, and may be derived from any suitable source. Asphalt is a hard solid and must be solubilized for addition to the other ingredients for mixing therewith and absorption by certain ones, such as the leather dust and clay-based gellant, during manufacture of the composition. Asphalt is solubilized by cutting it back with about an equal portion by weight of mineral spirits having a flash point of at least 100° F. This volatile solvent evaporates after application of the improved undercoating composition to the surface to be protected, leaving a hard coat.

A solubilized asphalt found satisfactory for use in the practice of the present invention is known as "CMS Asphalt" available from Ashland Petroleum Company, Buffalo, N.Y. It has an asphalt content of from 44 to 48% by weight, a flash point of at least 100° F., an API gravity of from 28 to 30, and a kinematic viscosity of 9 to 10 centistokes at 140° F.

The following formulation is a preferred example of an undercoating composition embodying the present invention which has been found very satisfactory under laboratory and road testing, the respective amounts indicated for the various ingredients being either parts by weight or percentages by weight.

PREFERRED EXAMPLE

| Leather dust | 3.50 |
|---|---|
| Water | .10 |
| Lime | 10.00 |
| Baragel | 3.00 |
| Propylene carbonate | .25 |
| T-22 fatty acid | 1.00 |
| CMS Asphalt | 82.15 |
| | 100.00 |

These ingredients were all brought together at ambient temperature. While no particular order of uniting the various ingredients seems necessary, the leather dust was first soaked in 40 parts of the CMS asphalt, and the lime was then added. The Baragel was then added, followed by the T-22 fatty acid. The balance of the CMS asphalt was then added, followed by the water and the propylene carbonate. These ingredients were thoroughly mixed in a conventional mixing kettle, and then passed through a commercially available homogenizer of the type used in the milk industry and operated at a pressure of at least 250 pounds per square inch. The result was a smooth homogenous sprayable undercoating composition weighing about 8.00 pounds per gallon and having an unworked penetration of 325 to 425, per ASTM D-217.

The examples of ingredients and the proportions thereof described herein are intended as illustrative of the practice of the present invention and not as limitative thereof. The scope of the invention is to be measured by the appended claims.

What is claimed is:

1. A coating composition, suitable for spray application to metal surfaces of vehicular underbodies for protection against corrosion, comprising a homogenous mixture consisting essentially of:
   (1) from 1 to 10% by weight of animal-derived leather dust;
   (2) from 0.1 to 1% by weight of water;
   (3) neutralizer in an amount by weight sufficient to adjust the pH of the leather dust to the range of from 9 to 11;
   (4) from 1 to 10% by weight of clay-based gellant;
   (5) from 0.1 to 1% by weight of polar dispersant;
   (6) from 0.1 to 5% by weight of organic rust inhibitor; and
   (7) the balance to make up 100% weight of solubilized asphalt containing volatile solvent.

2. A costing composition according to claim 1 wherein the content of said leather dust is about 3.5%; the content of water is about 0.1%, said neutralizer is lime and its content is about 10.0%; said gellant is an organophilic clay and its content is about 3%; the content of said dispersant is about 0.25%; said inhibitor is a tallow fatty acid and its content is about 1%; and said solubilized asphalt is asphalt cutback with mineral spirits and its content is about 82.15%.

3. A coating composition according to claim 2 wherein said organophilic clay contains dimethyldioctadecyl and dimethylbenzloctadcyl ammonium bentonite, and said dispersant is propylene carbonate.

4. Method of making a coating composition, suitable for spray application to metal surfaces of vehicular underbodies for protection against corrosion, comprising the steps of:
   (1) wetting 1 to 10 parts by weight of animal-derived leather dust with 40 parts of solublized asphalt containing volatile solvents;
   (2) adding a neutralizer in an amount by weight sufficient to adjust the pH of the wetted leather dust to the range of 9–11;
   (3) mixing 1.0 to 10 parts by weight of clay-based gellant and 0.1 to 5.0 parts by weight of organic rust inhibitor to provide a first resultant mixture;
   (4) mixing said first resultant mixture with the balance of the solublized asphalt to provide a second resultant mixture;
   (5) mixing said second resultant mixture with 0.1 to 1.0 parts by weight of water to provide a third resultant mixture;
   (6) mixing said third resultant mixture with 0.1 to 1.0 parts by weight of polar dispersant to provide a fourth resultant mixture; and
   (7) homogenizing said fourth resultant mixture utilizing a gauge pressure of at least 250 pounds per square inch.

* * * * *